United States Patent [19]

Broer et al.

[11] Patent Number: 4,738,509

[45] Date of Patent: Apr. 19, 1988

[54] OPTICAL GLASS FIBER HAVING A SYNTHETIC RESIN CLADDING

[75] Inventors: Dirk J. Broer; Grietje N. Mol, both of Eindhoven, Netherlands

[73] Assignee: U.S. Philips Corporation, New York, N.Y.

[21] Appl. No.: 737,994

[22] Filed: May 28, 1985

[30] Foreign Application Priority Data

Jun. 22, 1984 [NL] Netherlands .......................... 8401982

[51] Int. Cl.$^4$ ............................................... G02B 6/00
[52] U.S. Cl. ................... 350/96.34; 428/373; 428/391; 428/392
[58] Field of Search ............... 428/373, 375, 374, 391, 428/392, 429; 350/96.30, 96.33, 96.34

[56] References Cited

U.S. PATENT DOCUMENTS

| | | | |
|---|---|---|---|
| 4,116,786 | 9/1978 | Hodakowski | 428/429 X |
| 4,324,575 | 4/1982 | Levy | 65/3.11 |
| 4,496,210 | 1/1985 | Ansel et al. | 428/429 X |
| 4,514,037 | 4/1985 | Bishop et al. | 350/96.34 X |

*Primary Examiner*—Lorraine T. Kendell
*Attorney, Agent, or Firm*—Norman N. Spain

[57] ABSTRACT

The invention provides an optical glass fiber having a synthetic resin cladding, in which the first layer of the synthetic resin cladding is formed from a curable synthetic resin composition which comprises a polyurethane acrylate and a siloxane copolymer containing acrylate groups.

The synthetic rubber obtained by curing has the suitable properties of polysiloxane claddings, and additionally a greater mechanical strength as well as a greater resistance to wear.

7 Claims, 1 Drawing Sheet

OPTICAL GLASS FIBER HAVING A SYNTHETIC RESIN CLADDING

BACKGROUND OF THE INVENTION

The invention relates to an optical glass fibre having a synthetic resin cladding, comprising a glass fibre and an enveloping layer of a synthetic rubber having a refractive index which is higher than the refractive index of the outermost layer of the glass fibre, the synthetic rubber being formed from a curable synthetic resin composition comprising a siloxane copolymer which has monomeric units comprising dimethyl siloxane and at least one siloxane selected from the group formed by methyl phenyl siloxane and diphenyl siloxane, which siloxane copolymer comprises at least two acrylate groups per molecule.

Such optical glass fibres are used for transmitting light signals for telecommunication purposes.

Such an optical glass fibre is described in Netherlands Patent Application No. 8400727. The siloxane copolymer employed has a number average molecular weight between 1,000 and 25,000.

The curable synthetic resin composition may further comprise one or several monomeric acrylate compounds as well as an initiator which can be activated by light.

Immediately after the glass fibre has been formed the curable synthetic resin composition is applied onto the glass fibre and subsequently cured by means of UV radiation or radiation by electrons. The curing time is shorter than 5 seconds, preferably shorter than 0.5 second.

The synthetic rubber thus obtained has a refractive index which is larger than 1.46, a modulus of elasticity between 0.1 and 10 MPa and a glass transition temperature of $-50°$ C. or lower. However, this synthetic rubber has a low resistance to wear and a low mechanical strength which complicates transport and storage of the optical glass fibre and the working of said fibre into a cable.

It is possible to increase the mechanical strength by adding an inorganic filler to the synthetic rubber, yet this has the disadvantage that the filling particles may damage the optical glass fibre. In general, the soft layer of synthetic rubber is protected by a second, harder synthetic resin cladding.

SUMMARY OF THE INVENTION

The invention has for its object to provide an optical glass fibre having a synthetic resin cladding and possessing the above-mentioned desired properties, which synthetic resin cladding also has a high resistance to wear and a high mechanical strength. This should preferably be achieved without using inorganic fillers.

According to the invention, this object is achieved by using a curable synthetic resin composition which further comprises a polyurethane acrylate which has a number average molecular weight of more than 3,000. Preferably, the curable synthetic resin composition comprises 5 to 60% by weight of the polyurethane acrylate.

DETAILED DESCRIPTION OF THE INVENTION

Figure 1:
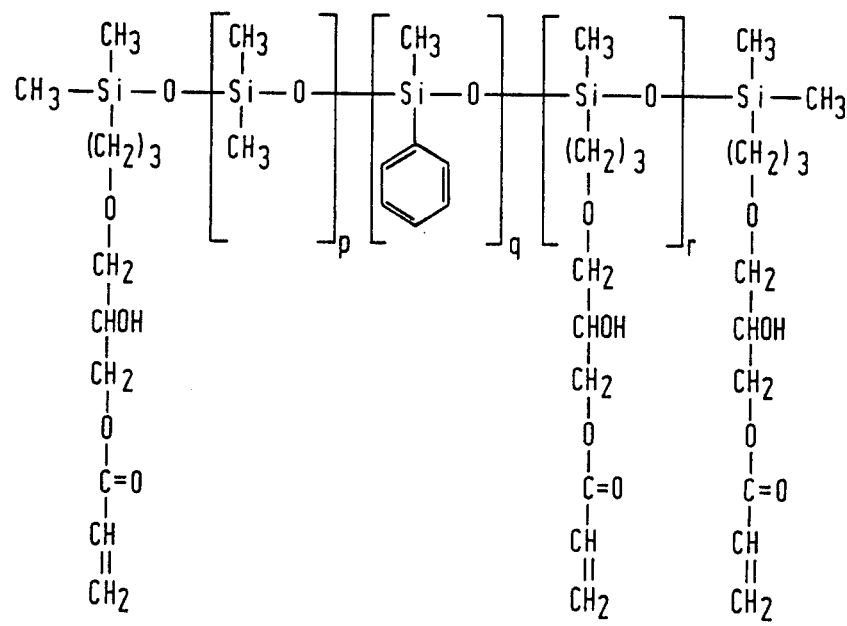
FIG. 1 is a structural formula of a siloxane copolymer suitable for use in the invention.

In a suitable embodiment of the optical glass fibre according to the invention, the polyurethane acrylate is a compound of the following structural formula:

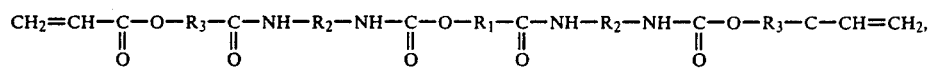

wherein $R_1$ is selected from the following group:

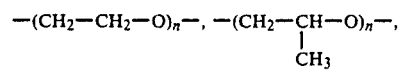

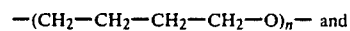 and

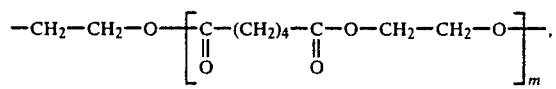

wherein the average value of n exceeds 60, wherein the average value of m exceeds 30, and wherein $R_2$ is selected from the following group:

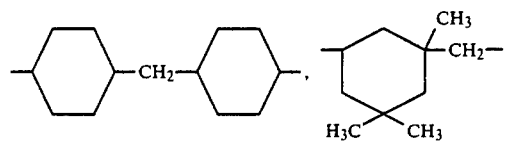

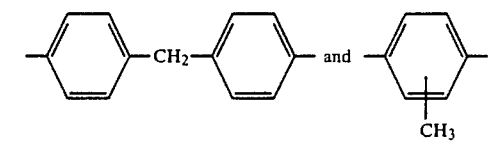

and wherein $R_3$ is selected from the following group:

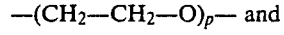

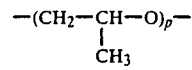

wherein p is at least 1.

Dependent upon the choice of $R_1$, the polyurethane acrylate is a polyether urethane acrylate or a polyester urethane acrylate.

In order to prevent that the suitable, low glass transition temperature of the siloxane copolymer from being raised to an undesired level by adding the polyurethane acrylate, it is desirable for the average value of n to be greater than 60 or the average value of m to be greater than 30. However, if the average value of n or m is too high this will result in too low a mechanical strength of the cured synthetic resin composition.

To obtain a suitable degree of miscibility of the siloxane copolymer and the polyurethane acrylate, it is desirable for the siloxane copolymer to contain a sufficiently high content of aromatic groups or of acrylate groups. A suitable quantity of acrylate groups in the siloxane copolymer would be, for example, 0.1 per monomeric unit. However, too high a content of aromatic groups will lead to a glass transition temperature of the synthetic rubber which is too high. Too high a content of acrylate groups per se will lead, unless further measures are taken, to a modulus of elasticity of the synthetic rubber which is too high. In order to obtain a suitable miscibility at a desired low glass transition temperature and low modulus of plasticity, it is effective if the siloxane copolymer contains polar groups. Preferably, these polar groups are hydroxyl-groups.

In a suitable embodiment of the glass fibre having a synthetic resin cladding according to the invention, the siloxane copolymer comprises, as monomeric units, at least one of the following groups:

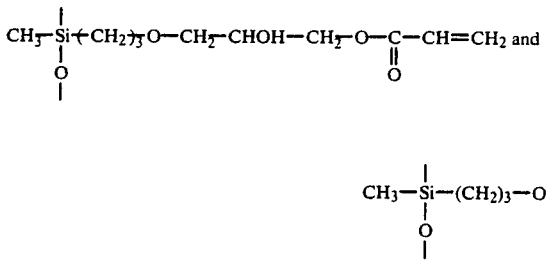

Suitably, in order to obtain a curable synthetic resin composition having a low viscosity and a high curing rate, the curable synthetic resin composition contains 1 to 10% by weight of one or more monomeric acrylate compounds. Preferably, these are selected from the group formed by 2-ethoxyethyl acrylate, 2'ethoxy-2-ethoxy-ethyl acrylate, 3-methoxypropyl acrylate, butyl acrylate, pentyl acrylate, hexyl acrylate, heptyl acrylate, octyl acrylate, nonyl acrylate, 2-ethyl-hexyl acrylate, 2-phenoxy-ethyl acrylate and 2'-(2-oxybenzophenone)-2-ethoxy-ethyl acrylate.

The curable synthetic resin composition can be cured by means of UV radiation or by means of radiation by electrons. If the curable synthetic resin composition is made to cure by means of UV suitable radiation, the curable synthetic resin composition comprises 0.1 to 10% by weight of an initiator that can be activated by light. Suitable initiators of the above-mentioned type are chosen from the group formed by 2,2-dimethoxy-2-phenyl-acetophenone, 2,2-diethoxy-aceto-phenone, 2,2-dimethyl-2-hydroxy-acetophenone and 2'(2-oxybenzophenone)-2-ethoxy ethyl acrylate.

Figure 2:
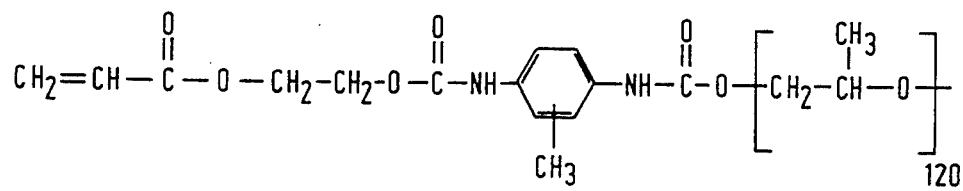
FIG. 2 is a structured formula of a polyether urethane acrylate suitable for use in the invention.
Figure 2:
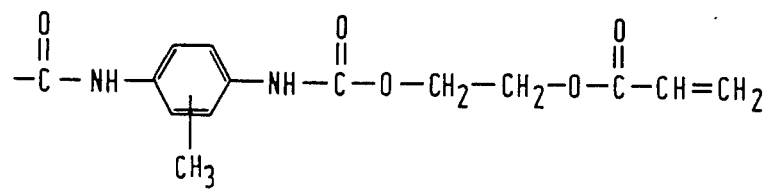

The invention will now be described in greater detail with reference to embodiments and to the drawing in which FIG. 1 represents the structural formula of a possible embodiment of a siloxane copolymer for use in an optical glass fibre in accordance with the invention, and wherein FIG. 2 represents the structural formula of a polyether urethane acrylate for use in a possible embodiment of an optical glass fibre in accordance with the invention.

EMBODIMENTS

A siloxane copolymer having a structural formula as shown in FIG. 1, wherein p has an average value of 150 and q has an average value of 100 and wherein r has an average value of 15, is prepared as follows:

160.2 g of acetic acid, 193.5 g of dimethyl dichlorosilane, 191 g of methyl phenyl dichlorosilane, 17.25 g of methyl dichlorosilane and 1.89 g of dimethyl monochloro silane are mixed in a container provided with a reflux condenser. While stirring, 87 g of methanol is added dropwise in 45 minutes. The HCl which is formed during the process is removed. The mixture is kept at the boiling point for 2 hours, subsequently the low-molecular and cyclic siloxanes are removed by extraction using ethanol. Thereafter, 200 ml of tetrahydrofuran, a catalytic quantity of hexachloroplatinic acid and 19.3 g of allyl glycidyl ether are added, after which the mixture is kept at the boiling point under a reflux condenser for 24 hours. An IR-spectrum of the mixture shows that all Si-H-bonds (recognizable in the spectrum by a peak at 2140 cm$^{-1}$) have been converted. The tetrahydrofuran is evaporated and the product is dried over MgSO$_4$ and purified by filtration. Subsequently, 200 ml of toluene, 12.2 g of acrylic acid and 0.7 g of benzyl dimethylamine are added. For a period of 16 hours this mixture is kept boiling under a reflux condenser, after which the toluene is removed by means of distillation at a temperature of 90° C. and at a pressure of 1300 Pa. Further purification of the product is achieved by means of filtration.

At a temperature of 25° C. the siloxane copolymer thus obtained has a viscosity of 1.03 Pa·s and a refractive index of 1.4887. By using a medium pressure mercury vapour lamp having an intensity of 0.6 W/cm$^2$, this siloxane copolymer is cured by a 0.1 second exposure. The synthetic rubber thus obtained has the following properties: the refractive index at 25° C. is 1.4890, the glass transition temperature is −68° C. and the modulus of elasticity is 0.8 MPa.

In order to improve the resistance to wear and the mechanical strength, the siloxane copolymer, before it is applied to the glass fibre and before it is cured, is mixed with a polyether urethane acrylate as shown in FIG. 2 and in the weight ratios as indicated in Table 1. 4.5% by weight of 2,2-dimethoxy-2-phenyl-acetophenone is added to these mixtures. This is a suitable quantity for curing a layer with a thickness of 40µ on the glass fibre. A few properties of the curable synthetic resin compositions prior to curing, and of the synthetic rubber after curing are recited in table 1.

TABLE 1

|  | A | B |
|---|---|---|
| Siloxane copolymer/polyether urethane acrylate | 3:1 | 1:1 |
| Viscosity at 25° C. (Pa · s) | 3.4 | 10.7 |
| Viscosity at 45° C. (Pa · s) | 1.1 | 3.4 |
| Refractive index at 25° C. | 1.4839 | 1.4781 |
| Exposure time (s) | 0.1 | 0.5 |
| after curing: |  |  |
| Refractive index at 25° C. | 1.4852 | 1.4787 |
| Glass transition temperature (°C.) | −64 | −59 |
| Modulus of elasticity (MPa) | 0.9 | 1.0 |

The curable synthetic resin compositions for use in an optical fibre, in accordance with the invention, hardly shrink in curing. The synthetic rubbers thus obtained have a high resistance to wear.

The Poisson ratio of the synthetic rubbers obtained by curing approximately equals 0.5. When a load is applied to the synthetic rubbers, substantially no shrinkage occurs. Consequently, in the case of variations in the length of the glass fibre, no microbends (and the associated transmission losses) develop due to mechanical stresses or changes in temperature.

What is claimed is:

1. An optical glass fibre having a synthetic resin cladding, comprising a glass fibre and an enveloping layer of a synthetic rubber having a refractive index which is higher than the refractive index of the outermost layer of the glass fibre, the synthetic rubber being formed from a curable synthetic resin composition comprising a copolymer which has monomeric units comprising dimethyl siloxane and at least one siloxane selected from the group formed by methyl phenyl siloxane and diphenyl siloxane, which siloxane copolymer comprises at least two acrylate groups per molecule, characterized in that the curable synthetic resin composition further comprises 5 to 60% by weight of polyurethane acrylate which has a number average molecular weight of more than 3,000.

2. An optical glass fibre as claimed in claim 1, characterized in that the polyurethane acrylate is a compound of the following structural formula:

$$CH_2=CH-\underset{\underset{O}{\|}}{C}-O-R_3-\underset{\underset{O}{\|}}{C}-NH-R_2-NH-\underset{\underset{O}{\|}}{C}-O-R_1-\underset{\underset{O}{\|}}{C}-NH-R_2-NH-\underset{\underset{O}{\|}}{C}-O-R_3-\underset{\underset{O}{\|}}{C}-CH=CH_2,$$

wherein $R_1$ is selected from the following group:

$$-(CH_2-CH_2-O)_n-, -(CH_2-\underset{\underset{CH_3}{|}}{CH}-O)_n-,$$

$$-(CH_2-CH_2-CH_2-CH_2-O)_n- \text{ and}$$

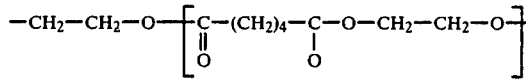

wherein the average value of n exceeds 60, wherein the average value of m exceeds 30, and wherein $R_2$ is selected from the following group:

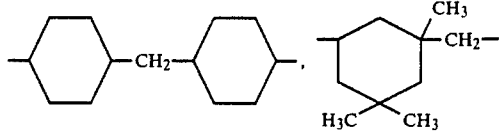

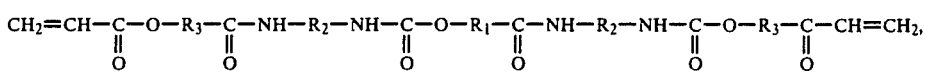

and wherein $R_3$ is selected from the following group: $-(CH_2-CH_2-O)_p-$ and $$-(CH_2-\underset{\underset{CH_3}{|}}{CH}-O)_p-,$$

wherein p is at least 1.

3. An optical glass fibre as claimed in claim 2, characterized in that the siloxane copolymer contains polar groups.

4. An optical glass fibre as claimed in claim 3, characterized in that the polar groups are hydroxyl groups.

5. An optical glass fibre as claimed in claim 4, characterized in that the siloxane copolymer comprises at least one of the following groups as monomeric units:

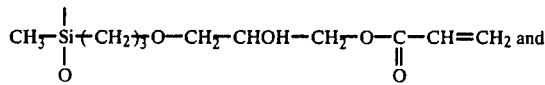

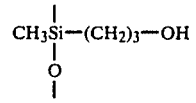

6. An optical glass fibre as claimed in claim 2, characterized in that the curable synthetic resin composition further comprises 1 to 10% by weight of a monomeric acrylate compound.

7. An optical glass fibre as claimed in claim 2, characterized in that the curable synthetic resin compound further comprises 0.1 to 10% by weight of an initiator that can be activated by light.

* * * * *